March 19, 1957 H. J. GOODYER Re. 24,291

DEVICE FOR INTRODUCING ATOMIZED LIQUID INTO GAS UNDER PRESSURE

Original Filed Jan. 21, 1950

Inventor
Harold J. Goodyer
By: Fred Gerlach
Atty.

United States Patent Office

Re. 24,291
Reissued Mar. 19, 1957

24,291

DEVICE FOR INTRODUCING ATOMIZED LIQUID INTO GAS UNDER PRESSURE

Harold J. Goodyer, Evanston, Ill., assignor, by mesne assignments, to Hills-McCanna Company, Chicago, Ill., a corporation of Illinois Original No. 2,613,067, dated October 7, 1952, Serial No. 139,809, January 21, 1950. Application for reissue March 9, 1956, Serial No. 570,662

10 Claims. (Cl. 184—55)

Matter enclosed in heavy brackets [ ] appears in the original patent but forms no part of this reissue specification; matter printed in italics indicates the additions made by reissue.

The present invention relates generally to devices for introducing a liquid in atomized or spray form into a stream of gas under pressure. More particularly the invention relates to that type of device which is designed primarily to be interposed in a pipe system between a compressor or other sources of air under pressure and a pneumatic tool, serves to introduce into the air under pressure in transit through the pipe system atomized oil for the purpose of lubricating the tool, and as its principal parts or components comprises: (1) a housing which is adapted to have the air under pressure flow through it and has inlet and outlet ducts with internal screw threads for connection to certain pipes of the pipe system; (2) a sump-like receptacle which is connected to, and depends from, the housing and is adapted to contain a body or column of oil; (3) a by-pass which is formed in the housing, extends between the inlet and outlet ducts and includes a Venturi tube; and (4) a suction tube which leads from the Venturi tube to the lower portion of the receptatcle and serves, in response to the aspirating effect of the Venturi tube during use or operation of the device, to supply oil in droplet form for admixture with the stream of air under pressure flowing through the Venturi tube.

One object of the invention is to provide a device of this type which is an improvement upon, and has certain inherent advantages over, previously designed devices for the same purpose and is characterized by the fact that it is extremely efficient in operation, embodies a novel arrangement of parts and is essentially simple in design or construction.

Another object of the invention is to provide an atomizer variety device of the type under consideration in which the housing is of inverted cup-shaped character and consists of a top wall and a continuous side wall, the inlet and outlet ducts are formed in the top wall of the housing, are disposed diametrically opposite one another and are separated by a centrally apertured cross partition, the sump-like receptacle for the oil is connected to the lower margin of the housing side wall, the Venturi tube extends vertically, is centrally disposed within the interior of the housing and has its upper end in communication with the inner end of the inlet duct and its lower end in communication with the housing interior, and the inner end of the outlet duct communicates with the housing interior by way of an opening to the end that the stream of air under pressure that is by-passed through the Venturi tube and has the oil in atomized form admixed with it is permitted to flow into the outlet duct for mixture with the air under pressure that flows directly from the inlet duct to the outlet duct via the aperture in the cross partition.

Another object of the invention is to provide a device of the last mentioned type and character in which the lower margin of the housing side wall and the upper end of the sump-like receptacle are separated by way of a horizontally extending disc-like baffle plate which is adapted to have the oil laden stream of air under pressure emanating from the lower end of the Venturi tube impinge against it preliminary to flowing through the opening into the outlet duct and has marginal slots whereby large droplets of oil are permitted to flow by gravity back to the receptacle.

Another object of the invention is to provide an atomizer variety device of the type and character under consideration in which the outlet duct in the top wall of the inverted cup-shaped housing has disposed therein a spring loaded valve which normally seats against the centrally apertured cross partition between the inner ends of the inlet and outlet ducts and serves automatically so to regulate the air under pressure that flows directly from the inlet duct into the outlet duct and the portion of the air under pressure that flows downwards through the Venturi tube that, regardless of variations in the pressure or rate of flow of air under pressure entering the device via the inlet duct, the amount of atomized oil in the air under pressure emanating from the outlet duct is substantially constant.

A further object of the invention is to provide a device of the last mentioned character in which the Venturi tube has associated with it an adjustable needle valve for controlling the proportion of the air under pressure that is by-passed through the Venturi tube.

A still further object of the invention is to provide an atomizer variety device which is generally of new and improved construction and not only effectively and efficiently fulfills its intended purpose but also is capable of being produced at a comparatively low cost.

Other objects of the invention and the various advantages and characteristics of the present atomizer variety device will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views.

Figure 1:
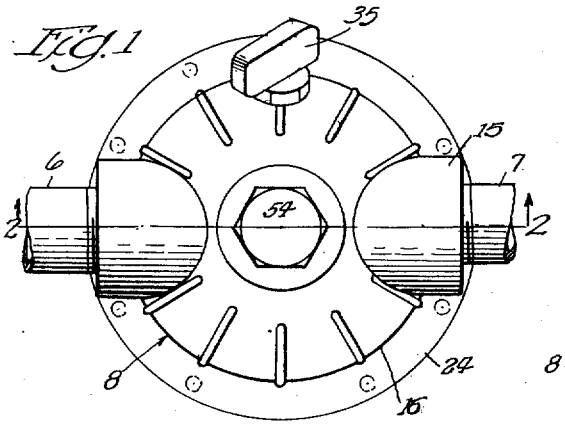
Figure 1 is a plan view of an atomizer variety device embodying the invention.
Figure 3:
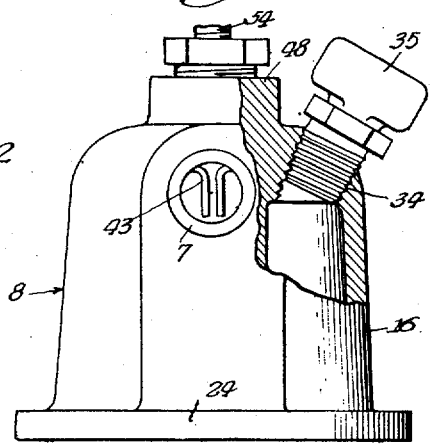
Figure 3 is a side view of the inverted cup-shaped housing, certain portions of the latter being broken away and other portions being shown in section in order to illustrate the plug closed opening whereby oil may be introduced into the receptacle.

The device which is shown in the drawing constitutes the preferred form or embodiment of the invention. It is designed primarily for use in connection with a pipe system between an air compressor or other source of air under pressure and a pneumatic tool and serves, as hereinafter described more in detail, to introduce into the air under pressure in transit through the pipe system atomized oil for lubricating the tool. The aforementioned pipe system includes a supply line 6 which leads from the compressor or other source of air under pressure, and in addition a discharge pipe 7 which leads to the pneumatic tool. As its principal components or parts the device comprises an inverted cup-shaped housing 8, a sump-like receptacle 9, a baffle plate 10, a Venturi tube 11, a suction tube 12, a valve assembly 13, and a needle valve 14.

Figure 2:
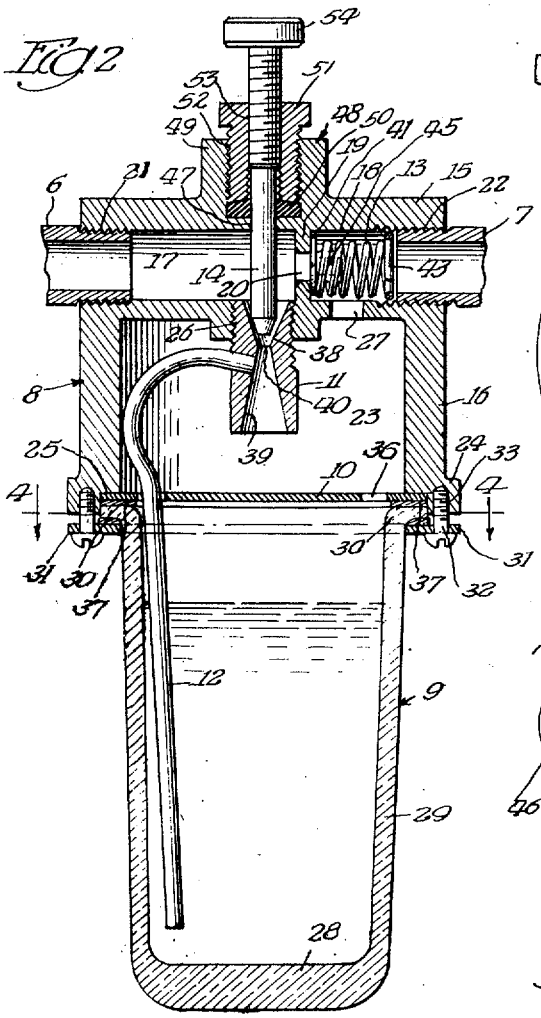
Figure 2 is a vertical section taken on the line 2—2 of Figure 1 and illustrating in detail the construction, design and arrangement of parts.
Figure 4:
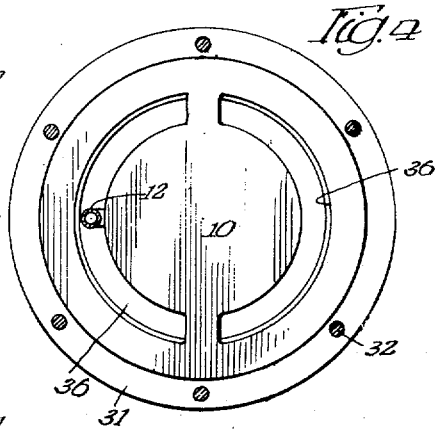
Figure 4 is a horizontal section taken on the line 4—4 of Figure 2 and showing in detail the construction and design of the baffle plate between the lower margin of the housing side wall and the upper end of the sump-like receptacle.

The inverted cup-shaped housing 8 is disposed between the outlet end of the supply pipe 6 and the inlet end of the discharge pipe 7 as shown in Figures 1 and 2. It is preferably in the form of a one-piece metallic casting and consists of a dome shaped top wall 15 and a continuous side wall 16. The housing top wall 15 is shaped to form a horizontally extending inlet duct 17 and a horizontally extending outlet duct 18. These ducts are disposed diametrically opposite one another and have the inner ends thereof separated by a cross partition 19 which is formed as an integral part of the housing top wall 15 and has a central aperture 20 for establishing direct communication between the inner ends of the inlet and outlet ducts. The outer end of the inlet duct 17 has an internal screw thread 21 for connection to an external screw thread on the outlet end of the supply pipe 6. The outer end of the outlet duct 18 is provided with an internal screw thread 22 for connection to an external screw thread on the inlet end of the discharge pipe 7. The continuous side wall 16 of the housing 8 is formed integrally with, and depends from, the marginal portion of the housing top wall 15 and defines with the latter a substantially cylindrical chamber 23. The lower end of the housing side wall 16 is provided with an outwardly and downwardly extending integral flange 24 which defines an internal downwardly facing annular seat 25. The part of the housing top wall 15 that defines the lower portion of the inner end of the inlet duct 17 has formed therein an open ended, internally threaded, circular hole 26. The latter, as shown in Figure 2, is in centered relation with the housing side wall 16. The part of the housing top wall that defines the lower portion of the inner end of the outlet duct 18 has formed therein a circular opening 27 which establishes communication between the upper portion of the chamber 23 and the inner end of the outlet duct.

The sump-like receptacle 9 is disposed directly beneath the housing 8 of the device and is adapted to contain a body or column of oil. It is preferably formed of molded, transparent "plastic" material and consists of a circular bottom wall 28 and a continuous upstanding side wall 29. The upper end of the side wall is provided with an integral, outwardly extending flange 30 which underlies the annular seat 25 within the outwardly and downwardly extending flange 24 on the lower end of the housing side wall 16. The receptacle 9 is removably secured to the housing 8 by a ring 31 and an annular series of vertically extending screws 32. The ring extends around the upper end of the receptacle side wall 29 and has the inner margin thereof in underlying relation with the outwardly extending flange 30. The screws 32 extend upwards through holes in the outer margin of the ring 31 and fit within internally threaded sockets 33 in the flange 24 on the lower end of the housing side wall 16. Oil is introduced into the receptacle 9 by way of a filler opening 34 in the top wall 15 of the housing 8. This opening is located at one side of the adjoining inner ends of the inlet and outlet ducts 17 and 18 and is normally closed by a screw plug 35. When the latter is removed oil may be poured through the filler opening 34. The oil that is poured through such opening flows downwards through the chamber 23 and thence into the receptacle 9. After filling of the receptacle 9 to the proper extent the plug 35 is screwed into the opening 34 so as to close the chamber 23.

The baffle plate 10 is disposed between the lower end of the housing side wall 16 and the upper end of the side wall 29 of the receptacle 9 and has its margin in abutment with the annular seat 25 and clamped in place by the outwardly extending flange 30 on the upper end of the receptacle side wall 29. It is in the form of a disc and has directly inwards of its clamped margin a pair of oppositely disposed arcuate slots 36. The latter permit the oil that is introduced into the chamber 23 via the filler opening 34 to flow into the interior of the receptacle 9 in connection with filling of the latter. Preferably a ring shaped gasket 37 is interposed between the outwardly extending flange 30 on the upper end of the receptacle side wall 29 and the margin of the disc-like baffle plate 10.

The Venturi tube 11 of the device extends vertically and is centrally disposed with respect to the depending continuous side wall 16 of the housing 8. It is of conventional design or construction and has an externally threaded upper end which fits within the circular, internally threaded hole 26 in the housing top wall 15 and communicates with the inner end of the inlet duct 17. The lower end of the Venturi tube 11 is spaced above the central portion of the baffle plate 10 as shown in Figure 2. The upper portion of the interior of the Venturi tube is shaped to form a downwardly tapered inlet passage 38 and the lower portion of the Venturi tube interior is shaped to form a downwardly flared outlet passage 39. These two passages are in communication with one another by way of a restricted or small sized orifice 40. When the device is in use part of the air under pressure that is introduced into the inlet duct 17 from the supply pipe 6 flows directly into the outlet duct 18 via the aperture 20 in the cross partition 19 and the balance or remainder of the air under pressure flows downwards through the Venturi tube 11 and then, after impinging against the central portion of the disc-like baffle plate 10, flows upwards through the opening 27 into the outlet duct 18 where it mixes with the part of the air that flows directly into the outlet duct from the inlet duct. The Venturi tube 11, the chamber 23 and the opening 27 constitute a closed by-pass between the inlet and outlet ducts.

The suction tube 12 extends upwards from the bottom portion of the interior of the receptacle 9 and leads through one of the arcuate slots 36 in the baffle plate 10. The upper end of the suction tube is disposed within the chamber 23 as shown in Figure 2. It is substantially semi-circular in shape and extends into the Venturi tube 11 at a point a small distance below the restricted orifice 40 in order that it is in communication with the upper end of the downwardly flared outlet passage 39. In connection with use of the device the stream of air under pressure that flows through the Venturi tube creates a suction effect in connection with passage thereof through the downwardly flared outlet passage 39 and this, in turn, serves to cause oil to flow upwards through the suction tube 12 and then enter the downwardly flowing stream in droplet form. As the drops of oil enter the downwardly flowing stream of air under pressure they are atomized. Atomization of the droplets is augmented as the result of impingement of the oil laden, downwardly flowing stream of air under pressure against the central portion of the disc-like baffle plate 10. After impinging against the central portion of the baffle plate the air under pressure with oil in atomized form flows upwards through the chamber 23 and after passage through the opening 27 mixes with the part of the air under pressure that flows directly from the inlet duct 17 into the outlet duct 18. Any large sized drops or globules of oil that accumulate on the baffle plate 10 return to the receptacle interior via the arcuate slots 36.

Figure 5:
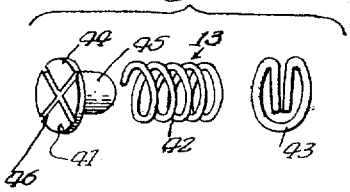
Figure 5 is a perspective of the valve assembly which is disposed in the outlet duct and consists of a valve, a spiral compression spring and a spring retainer.

The valve assembly 13 is disposed in the outlet duct 18 and serves automatically so to regulate the air under pressure that flows through the housing 8 that regardless of variations in the pressure or rate of flow of the air entering the device via the inlet duct the amount of atomized oil in the air emanating from the outlet duct is substantially constant. It is disclosed in Figures 2 and 5 and consists of a valve 41, a spring 42 and a spring retainer 43. The valve 41 is in the form of a disc 44 and a reduced stem 45 and is movable horizontally into and out of seated relation with the surface of the cross partition 19 that defines the inner end of the outlet duct 18. The valve disc 44 embodies in the surface thereof that faces the cross partition 19 a plurality of radially extending grooves 46 which permit a small amount of air under pressure to flow directly from the inlet duct 17 to the outlet duct 18 while the valve 41 is in its closed position and result in quick unseating of the valve when the pressure of the air in the inlet duct is increased to the point where it is sufficient to overcome the pressure of the spring 42. The latter is a spiral compression spring and extends lengthwise of the outlet duct 18. The inner end of the spring 42 surrounds the stem 45 of the valve 41 and abuts against the valve disc 44. As shown in Figure 2 the stem 45 is connected to the central portion of the valve disc 44 and extends in the direction of the outer end of the outlet duct. The outer end of the spiral compression spring 42 abuts against the spring retainer 43. The latter is formed of a length of wire, the central portion of which is bent into substantially circular form and the end portions of which are bent inwards to form abutments for the outer end of the spring. The spring retainer fits within the internal screw thread 22 at the outer end of the outlet duct 18 and, due to its construction, is contractable so that it may be inserted into place and also removed. When the retainer is turned in one direction it feeds inwards and increases the compression of the spring 42 and when the retainer is turned in the reverse direction it feeds outwards and thus results in a decrease in the compression of the spring. By adjusting the position of the retainer the compression of the spring 42 may be varied as desired. The valve assembly serves so to control the air under pressure that flows through the housing that the ratio of the air that flows directly into the outlet duct 18 from the inlet duct 19 and the air that flows through the Venturi tube 11 is substantially constant regardless of variations in the pressure or rate of flow of the air that enters the inlet duct. By employing the valve assembly the air under pressure emanating from the outlet duct 18 has at all times a substantially constant amount of atomized oil in it.

The needle valve 14 serves to regulate the proportion of the air under pressure that is by-passed through the Venturi tube 11 and thus control the amount of atomized oil in the air under pressure emanating from the outlet duct 19. It extends vertically and has a tapered lower end which is disposed within the downwardly tapered inlet passage 38 in the Venturi tube 11. The central portion of the needle valve 14 extends through a hole 47 in the central upper portion of the housing top wall 15 and also through a packing gland 48. The latter consists of a vertically extending ring shaped member 49 on the upper central portion of the housing top wall 15, an annular mass 50 of packing material in the lower end of the ring shaped member 49 and a tubular follower 51 in the upper end of said member. The follower is connected to the member 49 by a screw thread connection 52 and serves when tightened to compress the mass 50 around the central portion of the needle valve 14. The upper end of the needle valve is connected to the interior of the tubular follower 51 by a screw thread connection 53 and has a knurled head 54 at its upper extremity. When the needle valve is turned in one direction relatively to the follower 51 it feeds downwards and thus curtails the amount of air that is by-passed through the Venturi tube 11. Reverse turning of the needle valve results in upward displacement of the tapered lower end of the valve with respect to the downwardly tapered inlet passage 38 and thus results in a greater proportion of air being by-passed through the Venturi tube. By adjusting the needle valve up or down the proportion of atomized oil to air may be regulated as desired.

When the device is in use or operation part of the air under pressure that enters the housing 8 via the inlet duct 17 flows directly into the outlet duct 18 and the balance or remainder of the air flows downwards through the Venturi tube 11 as hereinbefore described. The stream of air under pressure that flows through the Venturi tube acquires oil in atomized form from the suction tube 12 and after impingement against the central portion of the baffle plate 10 flows upwards through the chamber 23 and the opening 27 into the outlet duct 18 where it admixes with the air under pressure that flows through the aperture 20 and past the valve 41 of the valve assembly 13. By raising the needle valve 14 the ratio of atomized oil and air is increased and by lowering the needle valve such ratio is decreased. The oil laden air under pressure emanating from the outlet duct 18 in the housing top wall 15 flows through the discharge pipe 7 to whatever pneumatic tool or other device is at the outlet end of such pipe and serves to operate and also lubricate such tool or other device.

The herein described device effectively and efficiently fulfills its intended purpose and, due to its construction, mode of operation and arrangement of parts, efficiently fulfills its intended purpose and is capable of being manufactured or produced at a low cost.

Whereas the device has been described as an instrumentality for introducing oil in atomized form into a stream of air under pressure it is to be understood that it may be used to introduce any other liquid in atomized or spray form into any gas under pressure. It is also to be understood that the invention is not to be restricted to the details set forth since these may be modified within the scope of the appended claims without departing from the spirit and scope of the invention.

*This application is a continuation of applicant's copending application Serial No. 316,104, now abandoned.*

Having thus described the invention what I claim as new and desire to secure by Letters Patent is:

1. A device adapted to introduce liquid in atomized form into gas under pressure and comprising an inverted cup-shaped housing embodying a top wall and a continuous side wall depending from the top wall and forming therewith a chamber, and having its top wall shaped to form a duct for receiving the gas under pressure, an outlet duct, a cross partition between the inner ends of the two ducts and with an aperture therein for permitting part of the gas under pressure that enters the inlet duct to flow directly into the outlet duct, and an opening establishing communication between the upper portion of the chamber and the inner end of the outlet duct; a receptacle connected removably to, and depending from, the lower end of the housing side wall and adapted to contain a column of liquid to be atomized; a vertically extending Venturi tube disposed in the upper portion of the chamber, having the upper end thereof in communication with the inner end of the inlet duct, and adapted to have the remainder of the gas under pressure that enters said inlet duct flow downwards in stream form therethrough; an upstanding suction tube having the lower end thereof leading to the bottom portion of the receptacle interior and its upper end extending laterally into the Venturi tube, and adapted in response to downward flow of the stream of gas through the Venturi tube to supply liquid in droplet form from the receptacle into said stream for admixture with, and atomization by, the latter; and a horizontal baffle plate extending across the lower portion of the chamber, clamped between the lower end of the housing side wall and the upper end of the receptacle, spaced a small distance beneath the lower end of the Venturi tube, and adapted to have the downwardly flowing stream of gas with the atomized liquid therein impinge against it and then to deflect such stream so that it flows upwards through the chamber and thence through the opening into the outlet duct for mixture with the gas admitted directly via said aperture.

2. A device adapted to introduce liquid in atomized form into gas under pressure and comprising an inverted cup-shaped housing embodying a top wall and a continuous side wall depending from the top wall and forming therewith a chamber, and having its top wall shaped to form a horizontal duct for receiving the gas under pressure, a horizontal diametrically opposite outlet duct, an upstanding cross partition between the inner ends of the two ducts and with an aperture therein for permitting part of the gas under pressure that enters the inlet duct to flow directly into the outlet duct, and a vertical opening for establishing communication between the upper portion of the chamber and the inner end of the outlet duct; a receptacle connected to, and depending from, the lower end of the housing side wall and adapted to contain a column of liquid to be atomized; a vertically extending Venturi tube disposed in the upper portion of the chamber, having the upper end thereof in communication with the inner end of the inlet duct, and adapted to have the remainder of the gas under pressure that enters said inlet duct flow downwards in stream form therethrough; an upstanding suction tube having the lower end thereof leading to the bottom portion of the receptacle interior and its upper end extending laterally into the Venturi tube, and adapted in response to downward flow of the stream of gas through the Venturi tube to supply liquid in droplet form from the receptacle into said stream for admixture with, and atomization by, the latter, and a horizontal baffle plate extending completely across the lower end of the housing side wall, spaced a small distance beneath the lower end of the Venturi tube, adapted to have the downwardly flowing stream of gas with the atomized liquid therein impinge against it and then to deflect such stream so that it flows upwards through said chamber and opening into the outlet duct for mixture with the gas admitted directly via said aperture, and having a slot-like opening in its marginal portion for permitting non-atomized liquid droplets that accumulate on the plate to return to the receptacle.

3. A device adapted to introduce liquid in atomized form into gas under pressure and comprising an inverted cup-shaped housing embodying a top wall and a continuous side wall depending from the top wall and forming therewith a chamber, and having its top wall shaped to form a duct for receiving the gas under pressure, an outlet duct, a cross partition between the inner ends of the two ducts and with an aperture therein for permitting part of the gas under pressure that enters the inlet duct to flow directly into the outlet duct, and an opening establishing communication between the upper portion of the chamber and the inner end of the outlet duct; a receptacle connected to, and depending from, the lower end of the housing side wall and adapted to contain a column of liquid to be atomized; a vertically extending Venturi tube disposed in the upper portion of the chamber, having the upper end thereof in communication with the inner end of the inlet duct, and adapted to have the remainder of the gas under pressure that enters said inlet duct flow downwards in stream form therethrough; an upstanding suction tube having the lower end thereof leading to the bottom portion of the receptacle interior and its upper end extending laterally into the Venturi tube, and adapted in response to downward flow of the stream of gas through the Venturi tube to supply liquid in droplet form from the receptacle into said stream for admixture with, and atomization by, the latter; a horizontal baffle plate extending across the lower portion of the chamber, spaced a small distance beneath the lower end of the Venturi tube, and adapted to have the downwardly flowing stream of gas with the atomized liquid therein impinge against it and then to deflect such stream so that it flows upwards through the chamber and thence through the opening into the outlet duct for mixture with the gas admitted directly via said aperture; and a spring loaded valve disposed in the outlet duct, movable into and out of seated relation with the cross partition, and operative automatically so to control the gas flow that the ratio of gas flowing directly into the inlet duct via the aperture in the cross partition to the gas that flows downwards through the Venturi tube is substantially constant regardless of variations in the pressure or rate of flow of the gas entering the inlet duct.

4. A device adapted to introduce liquid in atomized form into gas under pressure and comprising an inverted cup-shaped housing embodying a top wall and a continuous side wall depending from the top wall and forming therewith a chamber, and having its top wall shaped to form a horizontal duct for receiving the gas under pressure, a horizontal diametrically opposite outlet duct, an upstanding cross partition between the inner ends of the two ducts and with an aperture therein for permitting part of the gas under pressure that enters the inlet duct to flow directly into the outlet duct, and a vertical opening for establishing communication between the upper portion of the chamber and the inner end of the outlet duct; a receptacle connected to, and depending from, the lower end of the housing side wall and adapted to contain a column of liquid to be atomized; a vertically extending Venturi tube disposed in the upper portion of the chamber, having the upper end thereof in communication with the inner end of the inlet duct, and adapted to have the remainder of the gas under pressure that enters said inlet duct flow downwards in stream form therethrough; an upstanding suction tube having the lower end thereof leading to the bottom portion of the receptacle interior and its upper end extending laterally into the Venturi tube, and adapted in response to downward flow of the stream of gas through the Venturi tube to supply liquid in droplet form from the receptacle into said stream for admixture with, and atomization by, the latter, a horizontal baffle plate extending completely across the lower end of the housing side wall, spaced a small distance beneath the lower end of the Venturi tube, adapted to have the downwardly flowing stream of gas with the atomized liquid therein impinge against it and then to deflect such stream so that it flows upwards through said chamber and opening into the outlet duct for mixture with the gas admitted directly via said aperture, and having a slot-like opening in its marginal portion for permitting non-atomized liquid droplets that accumulate on the plate to return to the receptacle; and a valve assembly disposed in the outlet duct, operative automatically so to control the gas flow that the ratio of gas flowing directly into the inlet duct via the aperture in the cross partition to the gas that flows downwards through the Venturi tube is substantially constant regardless of variations in the pressure or rate of the flow of the gas entering the inlet duct, and consisting of a valve movable into and out of seated relation with the cross partition, a spiral compression spring arranged to urge the valve towards the cross partition and having one end thereof in abutment with said valve, and a spring retainer abutting against the other end of the spring and mounted so that it may be adjusted to vary the compression of the spring.

5. A device adapted to introduce liquid in atomized form into gas under pressure and comprising an inverted cup-shaped housing embodying a top wall and a continuous side wall depending from the top wall and forming therewith a chamber, and having its top wall shaped to form a duct for receiving the gas under pressure, an outlet duct, a cross partition between the inner ends of the two ducts and with an aperture therein for permitting part of the gas under pressure that enters the inlet duct to flow directly into the outlet duct, and an opening establishing communication between the upper portion of the chamber and the inner end of the outlet duct; a receptacle connected to, and depending from, the lower end of the housing side wall and adapted to contain a column of liquid to be atomized; a vertically extending Venturi tube disposed in the upper portion of the chamber, having the upper end thereof in communication with the inner end of the inlet duct, and adapted to have the remainder of the gas under pressure that enters said inlet duct flow downwards in stream form therethrough; an upstanding suction tube having the lower end thereof leading to the bottom portion of the receptacle interior and its upper end extending laterally into the Venturi tube, and adapted in response to downward flow of the stream of gas through the Venturi tube to supply liquid in droplet form from the receptacle into said stream for admixture with, and atomization by, the latter; a horizontal baffle plate extending across the lower portion of the chamber, spaced a small distance beneath the lower end of the Venturi tube, and adapted to have the downwardly flowing stream of gas with the atomized liquid therein impinge against it and then to deflect such stream so that it flows upwards through the chamber and thence through the opening into the outlet duct for mixture with the gas admitted directly via said aperture; a spring loaded valve disposed in the outlet duct, movable into and out of seated relation with the cross partition, and operative automatically so to control the gas flow that the ratio of gas flowing directly into the inlet duct via the aperture in the cross partition to the gas that flows downwards through the Venturi tube is substantially constant regardless of variations in the pressure or rate of flow of the gas entering the inlet duct; and a vertically extending and adjustable needle valve extending through the housing top wall, having its lower end disposed in the upper end of the Venturi tube, and adapted in response to adjustment thereof selectively to determine said ratio.

6. A device adapted to introduce liquid in atomized form into gas under pressure and comprising an inverted cup-shaped housing embodying a top wall and a continuous side wall depending from the top wall and forming therewith a chamber, and having its top wall shaped to form a horizontal duct for receiving the gas under pressure, a horizontal diametrically opposite outlet duct, an upstanding cross partition between the inner ends of the two ducts and with an aperture therein for permitting part of the gas under pressure that enters the inlet duct to flow directly into the outlet duct, and a vertical opening for establishing communication between the upper portion of the chamber and the inner end of the outlet duct; a receptacle connected to, and depending from, the lower end of the housing side wall and adapted to contain a column of liquid to be atomized; a vertically extending Venturi tube disposed in the upper portion of the chamber, having the upper end thereof in communication with the inner end of the inlet duct, and adapted to have the remainder of the gas under pressure that enters said inlet duct flow downwards in stream form therethrough; an upstanding suction tube having the lower end thereof leading to the bottom portion of the receptacle interior and its upper end extending laterally into the Venturi tube, and adapted in response to downward flow of the stream of gas through the Venturi tube to supply liquid in droplet form from the receptacle into said stream for admixture with, and atomization by, the latter, a horizontal baffle plate extending completely across the lower end of the housing side wall, spaced a small distance beneath the lower end of the Venturi tube, adapted to have the downwardly flowing stream of gas with the atomized liquid therein impinge against it and then to deflect such stream so that it flows upwards through said chamber and opening into the outlet duct for mixture with the gas admitted directly via said aperture, and having a slot-like opening in its marginal portion for permitting non-atomized liquid droplets that accumulate on the plate to return to the receptacle; a valve assembly disposed in the outlet duct, operative automatically so to control the gas flow that the ratio of gas flowing directly into the inlet duct via the aperture in the cross partition to the gas that flows downwards through the Venturi tube is substantially constant regardless of variations in the pressure or rate of the flow of the gas entering the inlet duct, and consisting of a valve movable into and out of seated relation with the cross partition, a spiral compression spring arranged to urge the valve towards the cross partition and having one end thereof in abutment with said valve, and a spring retainer abutting against the other end of the spring and mounted so that it may be adjusted to vary the compression of the spring; and a vertically extending and adjustable needle valve extending through the housing top wall, having its lower end disposed in the upper end of the Venturi tube, and adapted in response to adjustment thereof selectively to determine said ratio.

*7. In an air line lubricator, a lubricant container, a cap on said container having an air passageway formed therethrough said passageway having an inlet and an outlet side and being provided between said inlet and outlet sides with means having a hole therethrough to connect the inlet and outlet sides of said passageway, a spring-pressed valve in said passageway adapted to seat against said means and close in a direction against the direction of flow of air through said passageway, said valve being formed with a passage for travel of air past said valve when in closed position, an atomizer connected to the inlet side of said passageway, the outlet end of which atomizer is in open communication with and disposed for directing atomized lubricant into said container, a line to draw lubricant from said container into said atomizer, and a communication between said container and the outlet side of said passageway.*

*8. In an air line lubricator, a lubricant container, a cap on said container having an air passageway formed therethrough, said passageway having communicating inlet and outlet end portions, an adjustable valve member in said passageway for controlling the flow of air directly from said inlet end portion to said outlet end portion, an atomizer connected to said inlet end portion, an outlet end of said atomizer being in communication with said container for delivering atomized lubricant thereto so that atomized lubricant passes into a space defined by said cap and said container, a line disposed for conducting lubricant from said container into said atomizer, and a communication between said space and the outlet end portion of said passageway.*

*9. A device adapted to introduce liquid in atomized form into gas under pressure comprising a housing embodying a top wall and having its top wall shaped to form a duct for receiving gas under pressure, an outlet duct, means at inner ends of the two ducts and with an aperture therein for permitting part of the gas under pressure that enters the inlet duct to flow directly into the outlet duct, and an opening establishing communication between the under side of said top wall and the outlet duct; a receptacle removably connected to and depending from said housing and adapted to contain a column of liquid to be atomized, a chamber being provided between the column of liquid and the underside of said top wall, a constricted tube member having an inlet end communicating with said inlet duct and an outlet end in communication with the receptacle, and adapted to have the remainder of the gas under pressure that enters said inlet duct flow in stream form therethrough and into said chamber; suction tube means having a lower end thereof leading to a bottom portion of the receptacle interior and an upper portion communicating with said constricted tube member, and adapted in response to flow of the stream of gas through the constricted tube member to supply liquid from the receptacle into said stream for admixture with, and atomization by the latter and delivery of the atomized liquid to the receptacle; and a baffle member disposed transversely in said chamber, and adapted to have the flowing stream of gas with the atomized liquid deflected by it so that the stream flows from the chamber and through the opening into the outlet duct for mixture with the gas admitted directly via said aperture.*

*10. A device adapted to introduce liquid in atomized*

*form in to gas under pressure comprising a body providing a main gas flow duct defining successively an inlet portion, a restricted portion, and an outlet portion having a cross sectional area greater than said restricted portion, a receptacle connected to and depending from said body and adapted to contain a column of liquid to be atomized, a chamber being provided between the column of liquid and said body and communicating with a portion of the receptacle adapted to contain the column of liquid, means having a gas passage therethrough interconnecting said duct inlet portion and said chamber for conducting a stream of bleed gas from said inlet portion to said chamber, liquid conduit means communicating with said receptacle for delivering liquid for discharge into the bleed air stream for atomizing the liquid, the outlet end of said gas passage being in communication with the receptacle for delivering atomized liquid thereto, and means providing an opening interconnecting said duct outlet portion at a point downstream of said restricted portion and*

*said chamber, through which opening atomized liquid passes from said chamber and into the main gas flow.*

References Cited in the file of this patent or the original patent

UNITED STATES PATENTS

| | | |
|---|---|---|
| 1,783,273 | Beach | Dec. 2, 1930 |
| 1,839,193 | Blanchard | Jan. 5, 1932 |
| 1,884,359 | Sturm | Oct. 25, 1932 |
| 1,917,125 | Jackson et al. | July 4, 1933 |
| 2,245,601 | Medsker | June 17, 1941 |
| 2,308,773 | Norgren | Jan. 19, 1943 |
| 2,428,277 | Heidbrink | Sept. 30, 1947 |
| 2,572,440 | Brush | Oct. 23, 1951 |
| 2,612,067 | Goodyer | Oct. 7, 1952 |
| 2,682,393 | Norgren | June 29, 1954 |

FOREIGN PATENTS

| | | |
|---|---|---|
| 440,069 | Great Britain | Dec. 19, 1935 |